(12) United States Patent
Sun et al.

(10) Patent No.: US 12,476,764 B2
(45) Date of Patent: Nov. 18, 2025

(54) CHANNEL QUALITY INDICATOR REPORTING METHOD AND INTEGRATED ACCESS BACKHAUL NODE

(71) Applicant: VIVO MOBILE COMMUNICATION CO., LTD., Guangdong (CN)

(72) Inventors: Peng Sun, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 425 days.

(21) Appl. No.: 17/983,192

(22) Filed: Nov. 8, 2022

(65) Prior Publication Data

US 2023/0060168 A1 Mar. 2, 2023

Related U.S. Application Data

(63) Continuation of application No. PCT/CN2021/092375, filed on May 8, 2021.

(30) Foreign Application Priority Data

May 11, 2020 (CN) ........................ 202010393800.X (51) Int. Cl.
*H04L 5/00* (2006.01)
*H04W 24/08* (2009.01)
*H04W 72/23* (2023.01)

(52) U.S. Cl.
CPC ........... *H04L 5/0057* (2013.01); *H04W 24/08* (2013.01); *H04W 72/23* (2023.01)

(58) Field of Classification Search
CPC ... H04W 24/10; H04W 76/15; H04W 56/003; H04W 24/08; H04W 72/23; H04L 5/0057
See application file for complete search history.

(56) References Cited

U.S. PATENT DOCUMENTS

2018/0279149 A1 9/2018 Li et al.
2019/0349079 A1 11/2019 Novlan et al.
(Continued)

FOREIGN PATENT DOCUMENTS

CN 106209277 A 12/2016
CN 109392068 A 2/2019
(Continued)

OTHER PUBLICATIONS

Extended European Search Report for Application No. 21804087.1, dated Oct. 9, 2023, 12 Pages.
(Continued)

*Primary Examiner* — Gary Mui
*Assistant Examiner* — Adam Lane Rusterholz
(74) *Attorney, Agent, or Firm* — BROOKS KUSHMAN P.C.

(57) ABSTRACT

A channel quality indicator reporting method and an integrated access backhaul node are provided. The channel quality indicator reporting method includes: obtaining a target CQI type that needs to be reported, where different interference information is used for calculating CQIs of different target CQI types, and interference of the IAB-DU to reception of the IAB-MT is considered in interference information used for calculating a CQI of the target CQI type; and calculating and reporting the CQI of the target CQI type.

18 Claims, 4 Drawing Sheets

(56) References Cited

U.S. PATENT DOCUMENTS

| | | | |
|---|---|---|---|
| 2020/0107383 A1* | 4/2020 | Novlan | H04W 76/15 |
| 2021/0218484 A1 | 7/2021 | Yuan et al. | |
| 2021/0219155 A1 | 7/2021 | Ye et al. | |
| 2021/0266128 A1 | 8/2021 | Zhang et al. | |

FOREIGN PATENT DOCUMENTS

| | | | | |
|---|---|---|---|---|
| CN | 110972156 A | | 4/2020 | |
| CN | 110972188 A | | 4/2020 | |
| WO | 2020015757 A1 | | 1/2020 | |
| WO | 2020019959 A1 | | 1/2020 | |
| WO | 2020033609 A1 | | 2/2020 | |
| WO | 2020051588 A1 | | 3/2020 | |
| WO | WO-2020063539 A1 * | 4/2020 | | H04B 17/345 |

OTHER PUBLICATIONS

3GPP "3rd Generation Partnership Project; Technical Specification Group Radio Access Network; NR; Physical layer procedures for data (Release 16)" 3GPP TS 38.214 V16.0.0 (Dec. 2019), 2019, 148 Pages.

Ericsson "On UE-side cross-link interference measurement and reporting" 3GPP TSG RAN WG1 Meeting Ad-Hoc Meeting 1901, Taipei, Taiwan, Jan. 2019, R1-1900758, 10 Pages.

Ericsson "IAB resource configuration and multiplexing" 3GPP TSG-RAN WG1 Meeting #98, Prague, CZ, Aug. 2019, R1-1909026, 11 Pages.

First Office Action for Chinese Application No. 202010393800.X, dated Mar. 28, 2022, 9 Pages.

ZTE, Sanechips, "IAB enhancements overview", 3GPP TSG RAN WG1 Meeting #92bis, Sanya, China, Apr. 16, 2018, R1-1804505, 5 Pages.

Huawei, HiSilicon, "Congestion reporting and handling for IAB networks", 3GPP TSG-RAN WG2#106, Reno, USA, May 13, 2019, R2-1906067, 3 Pages.

CMCC, "Remaining issues on resource multiplexing among backhaul and access links" 3GPP TSG RAN WG1 #100 e-Meeting, Mar. 6, 2020, R1-2000745, 3 Pages.

Ericsson, "Definition of IAB half-duplex operation in paired spectrum", e-Meeting, 3GPP TSG-RAN WG1 Meeting #100bis-e, Apr. 30, 2020, R1-2002650, 3 Pages.

International Search Report and Written Opinion for Application No. PCT /CN2021/092375, dated Aug. 5, 2021, 7 Pages.

* cited by examiner

CHANNEL QUALITY INDICATOR REPORTING METHOD AND INTEGRATED ACCESS BACKHAUL NODE

CROSS-REFERENCE TO RELATED APPLICATIONS

This application is a continuation of PCT International Application No. PCT/CN2021/092375 filed on May 8, 2021, which claims priority to Chinese Patent Application No. 202010393800.X, filed on May 11, 2020, both of which are incorporated herein by reference in their entireties.

TECHNICAL FIELD

Embodiments of the present application relate to the field of wireless communications technologies, and in particular, to a channel quality indicator reporting method and an integrated access backhaul node.

BACKGROUND

Introduction of integrated access backhaul (IAB) system is to resolve a problem that a wired transmission network is not deployed in place for densely deployed access points. That is, when no wired transmission network is present, the access points may rely on wireless backhaul.

An IAB node includes a distributed unit (DU) functional part and a mobile terminal (MT) functional part.

In an interference handling method of new radio (NR), the LAB-MT can measure interference information of its channel, and report a channel quality indicator (CQI) to its parent IAB node.

However, at present, interference of the IAB-DU to the IAB-MT is not considered in the interference information of the channel measured by the IAB-MT and the reported CQI, resulting in inaccuracy of the reported CQI and affecting transmission on a backhaul link.

SUMMARY

According to a first aspect, an embodiment of the present application provides a channel quality indicator reporting method, applied to an IAB node, where the IAB node includes an IAB-DU and an IAB-MT. The method includes:

obtaining a target CQI type that needs to be reported, where different interference information is used for calculating CQIs of different target CQI types, and interference of the IAB-DU to reception of the IAB-MT is considered in interference information used for calculating a CQI of the target CQI type; and calculating and reporting the CQI of the target CQI type.

According to a second aspect, an embodiment of the present application provides a channel quality indicator reporting method, applied to an IAB node and including:

receiving a CQI reported by a child IAB node, where the child IAB node includes an IAB-DU and an IAB-MT; and determining a target CQI type of the reported CQI, where different interference information is used for calculating CQIs of different target CQI types, and interference of the IAB-DU to reception of the IAB-MT is considered in interference information used for calculating the CQI of the target CQI type.

According to a third aspect, an embodiment of the present application provides an integrated access backhaul node, including:

a first obtaining module, configured to obtain a target CQI type that needs to be reported, where different interference information is used for calculating CQIs of different target CQI types, and interference of the IAB-DU to reception of the IAB-MT is considered in interference information used for calculating a CQI of the target CQI type; and a reporting module, configured to calculate and report the CQI of the target CQI type.

Optionally, the target CQI type includes at least one of the following:

a first CQI type, where interference corresponding to the interference information used for calculation of a CQI of the first CQI type includes interference of transmission of the IAB-DU to reception of the IAB-MT;

a second CQI type, where interference corresponding to the interference information used for calculation of a CQI of the second CQI type includes interference of reception of the IAB-DU to reception of the IAB-MT;

a third CQI type, where interference corresponding to the interference information used for calculation of a CQI of the third CQI type includes interference of another interference source to reception of the IAB-MT;

a fourth CQI type, where interference corresponding to the interference information used for calculation of a CQI of the fourth CQI type includes a sum of interference of transmission of the IAB-DU to reception of the IAB-MT and interference of another interference source to reception of the IAB-MT; or a fifth CQI type, where interference corresponding to the interference information used for calculation of a CQI of the fifth CQI type includes a sum of interference of reception of the IAB-DU to reception of the IAB-MT and interference of another interference source to reception of the IAB-MT; where the another interference source is interference other than the interference of transmission and/or reception of the IAB-DU to reception of the IAB-MT.

Optionally, the target CQI type is determined in at least one of the following manners:

being specified by a protocol;

being configured by a parent IAB node or a CU;

being dynamically indicated by the parent IAB node or the CU; or being determined by the IAB node.

Optionally, if the target CQI type is configured by the parent IAB node or the CU, the first obtaining module is configured to receive CSI report configuration information, where the CSI report configuration information carries the target CQI type.

Optionally, the CSI report configuration information includes a CSI report quantity field, the CSI report quantity field includes at least one report CQI item, and the report CQI item indicates at least one target CQI type that needs to be reported; or the CSI report configuration information includes a CSI report quantity field and an indicator field, the CSI report quantity field includes at least one report CQI item, and the indicator field is used to indicate at least one target CQI type corresponding to the report CQI item.

Optionally, the target CQI type carried in the CSI report configuration information is at least one of a plurality of optional CQI types specified by the protocol.

Optionally, if the target CQI type is dynamically indicated by the parent IAB node or the CU, the first obtaining module is configured to receive downlink control information, where the downlink control information is used to indicate at least one target CQI type that needs to be reported. Optionally, the downlink control information is downlink control information that triggers aperiodic or semi-static CSI reporting.

Optionally, the reporting module is configured to carry the target CQI type during CQI reporting.

Optionally, the IAB node further includes:

a second obtaining module, configured to obtain CSI report configuration information, where the CSI report configuration information carries an indicator indicating whether the target CQI type is carried in the CQI for reporting.

Optionally, the first obtaining module is configured to obtain, based on configuration of a measurement resource, the target CQI type that needs to be reported, where the measurement resource includes at least one of the following: a channel measurement resource, an interference measurement resource, or a cross-link interference measurement resource.

Optionally, the first obtaining module executes at least one of the following:

if the channel measurement resource and/or the interference measurement resource is configured with a first time occasion, reception of the IAB-MT and transmission of the IAB-DU being at the first time occasion, determining that the target CQI type includes at least one of the following: the first CQI type or the fourth CQI type;

if the channel measurement resource and/or the interference measurement resource is configured with a second time occasion, reception of the IAB-MT and reception of the IAB-DU being at a second time occasion, determining that the target CQI type includes at least one of the following: the second CQI type and the fifth CQI type; or if the interference measurement resource configuration overlaps the cross-link interference measurement resource configuration, determining that the target CQI type includes at least one of the following: the second CQI type or the fifth CQI type.

According to a fourth aspect, an embodiment of the present application provides an integrated access backhaul node, including:

a receiving module, configured to receive a CQI reported by a child IAB node, where the child IAB node includes an IAB-DU and an IAB-MT; and a determining module, configured to determine a target CQI type of the reported CQI, where different interference information is used for calculating CQIs of different target CQI types, and interference of the IAB-DU to reception of the IAB-MT is considered in interference information used for calculating the CQI of the target CQI type.

Optionally, the target CQI type includes at least one of the following:

a first CQI type, where interference corresponding to the interference information used for calculation of a CQI of the first CQI type includes interference of transmission of the IAB-DU to reception of the IAB-MT;

a second CQI type, where interference corresponding to the interference information used for calculation of a CQI of the second CQI type includes interference of reception of the IAB-DU to reception of the IAB-MT;

a third CQI type, where interference corresponding to the interference information used for calculation of a CQI of the third CQI type includes interference of another interference source to reception of the IAB-MT;

a fourth CQI type, where interference corresponding to the interference information used for calculation of a CQI of the fourth CQI type includes a sum of interference of transmission of the IAB-DU to reception of the IAB-MT and interference of another interference source to reception of the IAB-MT; or a fifth CQI type, where interference corresponding to the interference information used for calculation of a CQI of the fifth CQI type includes a sum of interference of reception of the IAB-DU to reception of the IAB-MT and interference of another interference source to reception of the IAB-MT; where the another interference source is interference other than the interference of transmission and/or reception of the IAB-DU to reception of the IAB-MT.

Optionally, the target CQI type is determined in at least one of the following manners:

being specified by a protocol;

being configured by the IAB node or a CU;

being dynamically indicated by the IAB node or the CU; or being determined by the child IAB node.

Optionally, if the target CQI type is configured by the IAB node or the CU, the IAB node further includes:

a first sending module, configured to send CSI report configuration information to the child IAB node, where the CSI report configuration information carries the target CQI type.

Optionally, the CSI report configuration information includes a CSI report quantity field, the CSI report quantity field includes at least one report CQI item, and the report CQI item is used to indicate at least one target CQI type that needs to be reported; or the CSI report configuration information includes a CSI report quantity field and an indicator field, the CSI report quantity field includes at least one report CQI item, and the indicator field is used to indicate at least one target CQI type corresponding to the report CQI item.

Optionally, the target CQI type carried in the CSI report configuration information is at least one of a plurality of optional CQI types specified by the protocol.

Optionally, if the target CQI type is dynamically indicated by the IAB node or the CU, the IAB node further includes:

a second sending module, configured to send downlink control information to the child IAB node, where the downlink control information is used to indicate at least one target CQI type that needs to be reported.

Optionally, the downlink control information is downlink control information that triggers aperiodic or semi-static CSI reporting.

Optionally, the determining module is configured to obtain the target CQI type carried in the reported CQI.

Optionally, the IAB node further includes:

a third sending module, configured to send CSI report configuration information to the child IAB node, where the CSI report configuration information carries an indicator indicating whether the target CQI type is carried in the CQI for reporting.

Optionally, the determining module is configured to determine, based on configuration of a measurement resource, the target CQI type of the reported CQI, where the measurement resource includes at least one of the following: a channel measurement resource, an interference measurement resource, or a cross-link interference measurement resource.

Optionally, the determining module is configured to execute at least one of the following:

if the channel measurement resource and/or the interference measurement resource is configured with a first time occasion, reception of the IAB-MT and transmission of the IAB-DU being at the first time occasion, determining that the target CQI type includes at least one of the following: the first CQI type or the fourth CQI type;

if the channel measurement resource and/or the interference measurement resource is configured with a second time occasion, reception of the IAB-MT and reception of the IAB-DU being at a second time occasion, determining that the target CQI type includes at least one of the following: the second CQI type or the fifth CQI type; or if the interference measurement resource configuration overlaps the cross-link interference measurement resource configuration, determining that the target CQI type includes at least one of the following: the second CQI type or the fifth CQI type.

According to a fifth aspect, an embodiment of the present application provides a terminal, including a processor, a memory, and a computer program stored in the memory and capable of running on the processor, when the computer program is executed by the processor, the steps of the channel quality indicator reporting method according to the first aspect are implemented, or when the computer program is executed by the processor, the steps of the channel quality indicator reporting method according to the second aspect are implemented.

According to a sixth aspect, an embodiment of the present application provides a computer-readable storage medium, where a computer program is stored in the computer-readable storage medium, and when the computer program is executed by a processor, the steps of the channel quality indicator reporting method according to the first aspect are implemented, or when the computer program is executed by a processor, the steps of the channel quality indicator reporting method according to the second aspect are implemented.

BRIEF DESCRIPTION OF DRAWINGS

Other advantages and benefits will become apparent to those of ordinary skill in the art by reading detailed description of the illustrative embodiments below. The accompanying drawings are merely intended to illustrate the objectives of the illustrative embodiments and are not intended to limit the present application. Throughout the accompanying drawings, the same reference numerals represent the same components. In the accompanying drawings.

DETAILED DESCRIPTION

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of the present application, the terms "an example" or "for example" are used to represent an example, an illustration, or a description. Any embodiment or design scheme described as "an example" or "for example" in the embodiments of the present application should not be construed as being more preferred or advantageous than other embodiments or design schemes. To be precise, the words such as "an example" or "for example" are intended to present a related concept in a specific manner.

The following describes the embodiments of the present application with reference to the accompanying drawings. A channel quality indicator reporting method and an integrated access backhaul node provided by the embodiments of the present application may be applied to a wireless communications system. The wireless communications system may be a 5G system, an evolved long term evolution (Evolved Long Term Evolution, eLTE) system, or a later evolved communications system.

The following first describes some communications terms involved in the embodiments of the present application.

(1) Integrated Access Backhaul (IAB) System

Figure 1:
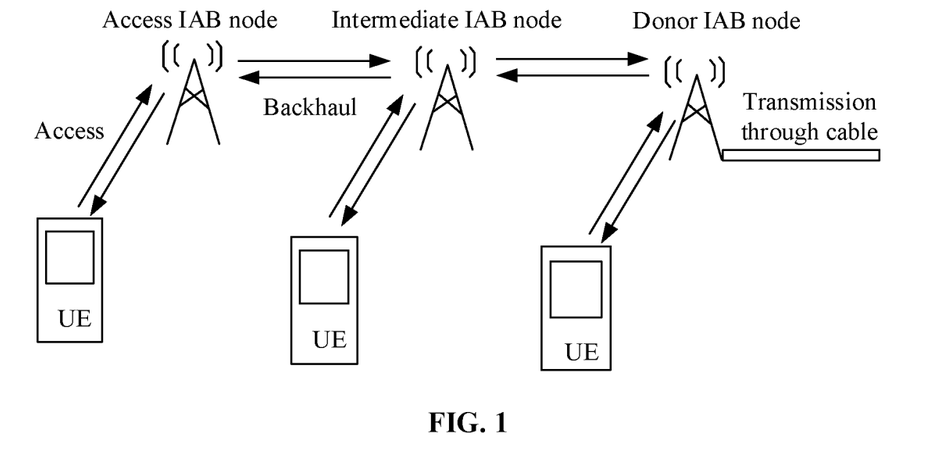
FIG. 1 is a schematic diagram of an IAB system.

FIG. 1 is a schematic diagram of an IAB system. One access point (that is, an access IAB node in FIG. 1) can find one upstream access point (that is, an intermediate IAB node (Intermediate IAB node in FIG. 1), also referred to as a parent IAB node), and establish a wireless connection to the upstream access point. The wireless connection is referred to as a backhaul link. The upstream access point also needs to establish a wireless connection to a donor IAB node, so as to establish a complete backhaul link. A complete backhaul link includes one donor IAB node, and the donor IAB node is directly connected to a wired transmission network through a cable. After an IAB node establishes a complete backhaul link, the IAB node is able to provide an access service for user equipments (UE).

Figure 2:
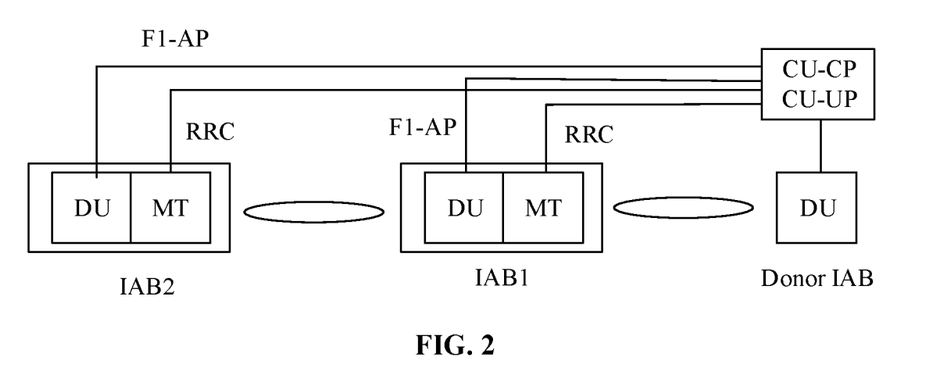
FIG. 2 is a schematic diagram of a CU-DU structure of an IAB system.

FIG. 2 is a schematic structural diagram of a centralized unit-distributed unit (CU-DU) of an IAB system. An IAB node includes a distributed unit (DU) functional part and a mobile terminal (MT) functional part. The donor IAB node has no MT functional part. By using an MT, an access point can find an upstream access point and establish a backhaul link to a DU of the upstream access point. After an IAB node has established a complete backhaul link, the IAB node enables its DU function and the DU provides cell services, that is, the DU may provide access services for UEs. In one backhaul link, DUs of all IAB nodes are connected to a centralized unit (CU) node, and the CU node configures the DUs through an F1-AP protocol, and configures MTs through a radio resource control (RRC) protocol.

(2) Status of Interference of the IAB-DU to the IAB-MT

A DU and an MT of an IAB node each can perform transmission (TX) and reception (RX) independently, and transmission and reception of the IAB-DU may cause interference to reception of the IAB-MT.

Figure 3:
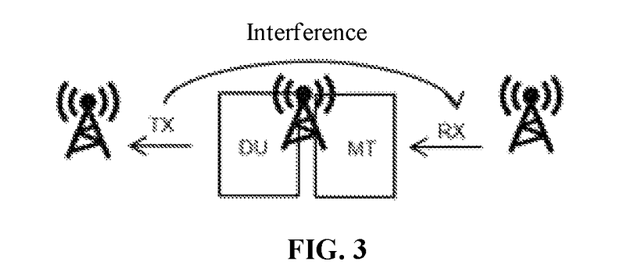
FIG. 3 is a schematic diagram of interference of transmission of an IAB-DU to reception of an IAB-MT.
Figure 4:
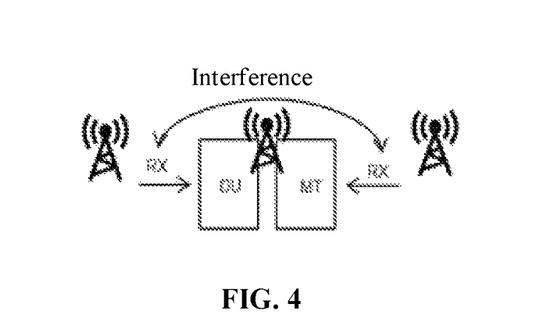
FIG. 4 is a schematic diagram of interference of reception of an IAB-DU to reception of an IAB-MT.

For a status of interference of transmission of the IAB-DU to reception of the IAB-MT, refer to FIG. 3. When transmission (TX) of the IAB-DU and reception (RX) of the IAB-MT are performed simultaneously, the transmission of the IAB-DU may interfere with the reception of the IAB-MT. For a status of interference of reception of the IAB-DU to reception of the IAB-MT, refer to FIG. 4. When reception (RX) of the IAB-DU and reception (RX) of the IAB-MT are performed simultaneously, a signal transmitted to the IAB-DU may leak to the IAB-MT, causing interference to the reception of the IAB-MT.

(3) Interference Measurement and Channel Quality Indicator (CQI) Reporting

In an interference handling method of NR, the IAB-MT may measure interference information of its channel and report a CQI to its parent IAB node.

However, at present, interference of the IAB-DU to the IAB-MT is not considered in the interference information of the channel measured by the IAB-MT and the reported CQI, resulting in inaccuracy of the reported CQI and affecting transmission on a backhaul link.

Figure 5:
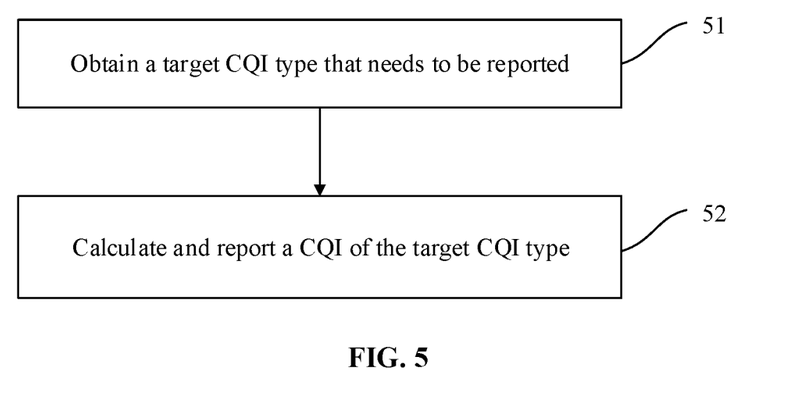
FIG. 5 is a schematic flowchart of a channel quality indicator reporting method according to an embodiment of the present application.

In order to resolve the above problem, referring to FIG. 5, FIG. 5 is a schematic flowchart of a channel quality indicator reporting method according to an embodiment of the present application. The method is applied to an IAB node, and the IAB node includes an IAB-DU and an IAB-MT. The method includes the following steps.

Step 51: Obtain a target CQI type that needs to be reported, where different interference information is used for calculating CQIs of different target CQI types, and interference of the IAB-DU to reception of the IAB-MT is considered in interference information used for calculating a CQI of the target CQI type.

Step 52: Calculate and report the CQI of the target CQI type.

In this embodiment of the present application, the CQI reported by the IAB node can reflect the interference of the IAB-DU to the IAB-MT, thereby making the reported CQI more accurate.

In this embodiment of the present application, optionally, the target CQI type includes at least one of the following:
a first CQI type, where interference corresponding to the interference information used for calculation of a CQI of the first CQI type includes interference of transmission of the IAB-DU to reception of the IAB-MT;
a second CQI type, where interference corresponding to the interference information used for calculation of a CQI of the second CQI type includes interference of reception of the IAB-DU to reception of the IAB-MT;
a third CQI type, where interference corresponding to the interference information used for calculation of a CQI of the third CQI type includes interference of another interference source to reception of the IAB-MT;
a fourth CQI type, where interference corresponding to the interference information used for calculation of a CQI of the fourth CQI type includes a sum of interference of transmission of the IAB-DU to reception of the IAB-MT and interference of another interference source to reception of the IAB-MT; or
a fifth CQI type, where interference corresponding to the interference information used for calculation of a CQI of the fifth CQI type includes a sum of interference of reception of the IAB-DU to reception of the IAB-MT and interference of another interference source to reception of the IAB-MT; where
the another interference source is interference other than the interference of transmission and/or reception of the IAB-DU to reception of the IAB-MT.

The interference information used for calculating the CQI of the fourth CQI type and/or the interference information used for calculating the CQI of the fifth CQI type is a maximum reference interference received by the IAB-MT at a corresponding time occasion.

(I) In some embodiments of the present application, the target CQI type may be determined in an explicit manner, which is illustrated by using an example below.

In this embodiment of the present application, the target CQI type is obtained in at least one of the following manners:

(1) Being specified by a protocol. or
(2) Being configured by a parent IAB node or a CU.

If the target CQI type is configured by the parent IAB node or the CU, optionally, the obtaining a target CQI type that needs to be reported includes: receiving CSI report configuration information, where the CSI report configuration information carries the target CQI type. The CSI report configuration information may be, for example, CSI-Report-Config (channel state information report configuration).

In some embodiments of the present application, optionally, the CSI report configuration information includes a CSI report quantity field, the CSI report quantity field includes at least one report CQI item (for example, cri-RI-PMI-CQI_TypeA, cri-RI-PMI-CQI_TypeB, or cri-RI-PMI-CQI_TypeA&B in the following Embodiment 1), and the report CQI item indicates at least one target CQI type that needs to be reported.

In this embodiment of the present application, optionally, the report CQI item is one of a plurality of optional report CQI items specified by the protocol.

In this embodiment of the present application, optionally, the target CQI type carried in the CSI report configuration information is at least one of a plurality of optional CQI types specified by the protocol.

In some other embodiments of the present application, optionally, the CSI report configuration information includes a CSI report quantity field and an indicator field, the CSI report quantity field includes at least one report CQI item, and the indicator field is used to indicate at least one target CQI type corresponding to the report CQI item. The CSI report quantity field is, for example, CSI reportQuantity.

In this embodiment of the present application, optionally, the indicator field includes a target parameter, and the target parameter is used to indicate at least one target CQI type corresponding to the report CQI item, and the target parameter is one of a plurality of optional parameters specified by the protocol.

In this embodiment of the present application, optionally, the target CQI type carried in the CSI report configuration information is at least one of a plurality of optional CQI types specified by the protocol.

In this embodiment of the present application, during configuring of the target CQI type, the existing CSI report configuration information may be used for configuration, so as to minimize signaling overheads and reduce impact on complexity of a device.

(3) Being dynamically indicated by the parent IAB node or the CU.

If the target CQI type is dynamically indicated by the parent IAB node or the CU, optionally, the obtaining a target CQI type that needs to be reported includes: receiving downlink control information (DCI), where the downlink control information is used to indicate at least one target CQI type that needs to be reported.

Optionally, the downlink control information includes a target code point, the target code point is used to indicate at least one target CQI type that needs to be reported, and the target CQI type indicated by the target code point is at least one of a plurality of CQI types specified by the protocol.

Optionally, the target code point is one of a plurality of optional code points specified by the protocol.

Optionally, the downlink control information is downlink control information that triggers aperiodic or semi-static CSI reporting.

In this embodiment of the present application, during indicating of the target CQI type, the existing DCI may be used for indication, so as to minimize signaling overheads and reduce impact on complexity of a device.

(4) Being determined by the IAB node.

In this embodiment of the present application, optionally, the calculating and reporting the CQI of the target CQI type includes: having the target CQI type carried in the CQI for reporting. For example, the target CQI type may be carried in a fixed field of CSI signaling carrying the CQI report.

Such manner is especially applicable to a case that the target CQI type is determined by the IAB node. Because the target CQI type is determined by the IAB node, the IAB node has the target CQI type carried in the CQI for reporting, so that the parent IAB node clearly learns of a type of the CQI reported by the IAB node, reaching consistent understanding.

In this embodiment of the present application, optionally, before the calculating and reporting the CQI of the target CQI type, the method further includes: obtaining CSI report configuration information, where the CSI report configuration information carries an indicator indicating whether the target CQI type is carried in the CQI for reporting. The CSI report configuration information may be, for example, CSI-ReportConfig.

(II) In some embodiments of the present application, the target CQI type may be determined through behavior of the IAB node in an implicit manner, which is illustrated by using an example below.

In some embodiments of the present application, the obtaining a target CQI type that needs to be reported includes: obtaining, based on configuration of a measurement resource, the target CQI type that needs to be reported, where the measurement resource includes at least one of the following: a channel measurement resource, an interference measurement resource, or a cross-link interference measurement resource.

Optionally, the obtaining, based on configuration of a measurement resource, the target CQI type that needs to be reported includes at least one of the following:

(1) If the channel measurement resource and/or the interference measurement resource is configured with a first time occasion, reception of the IAB-MT and transmission of the IAB-DU being at the first time occasion, determining that the target CQI type includes at least one of the following: the first CQI type or the fourth CQI type.

That is, the target CQI type includes at least one of the following:
a first CQI type, where interference corresponding to the interference information used for calculation of a CQI of the first CQI type includes interference of transmission of the IAB-DU to reception of the IAB-MT; or
a fourth CQI type, where interference corresponding to the interference information used for calculation of a CQI of the fourth CQI type includes a sum of interference of transmission of the IAB-DU to reception of the IAB-MT and interference of another interference source to reception of the IAB-MT.

(2) If the channel measurement resource and/or the interference measurement resource is configured with a second time occasion, reception of the IAB-MT and reception of the IAB-DU being at a second time occasion, determining that the target CQI type includes at least one of the following: the second CQI type and or fifth CQI type.

That is, the target CQI type includes at least one of the following:
a second CQI type, where interference corresponding to the interference information used for calculation of a CQI of the second CQI type includes interference of reception of the IAB-DU to reception of the IAB-MT; or
a fifth CQI type, where interference corresponding to the interference information used for calculation of a CQI of the fifth CQI type includes a sum of interference of reception of the IAB-DU to reception of the IAB-MT and interference of another interference source to reception of the IAB-MT. or (3) If the interference measurement resource configuration overlaps (completely or partially) the cross-link interference (Cross Link Interference, CLI) measurement resource configuration, determining that the target CQI type includes at least one of the following: the second CQI type or the fifth CQI type.

The cross-link interference measurement resource configuration includes, for example, SRS-RSRP (reference signal received power) and/or SRS-RSSI (received signal strength indication) measurement resources.

That is, the target CQI type includes at least one of the following:
a second CQI type, where interference corresponding to the interference information used for calculation of a CQI of the second CQI type includes interference of reception of the IAB-DU to reception of the IAB-MT; or
a fifth CQI type, where interference corresponding to the interference information used for calculation of a CQI of the fifth CQI type includes a sum of interference of reception of the IAB-DU to reception of the IAB-MT and interference of another interference source to reception of the IAB-MT.

Figure 6:
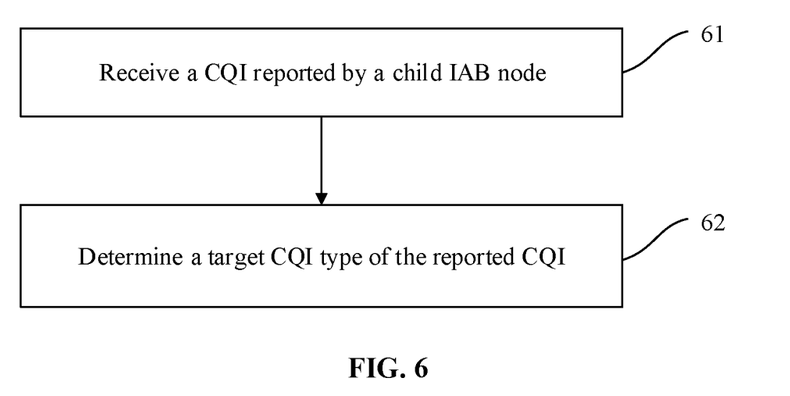
FIG. 6 is a schematic flowchart of a channel quality indicator reporting method according to another embodiment of the present application.

Referring to FIG. 6. FIG. 6 is a schematic flowchart of a channel quality indicator reporting method according to another embodiment of the present application. The channel quality indicator reporting method is applied to an IAB node and includes the following steps.

Step 61: Receive a CQI reported by a child IAB node, where the child IAB node includes an IAB-DU and an IAB-MT.

Step 62: Determine a target CQI type of the reported CQI, where different interference information is used for calculating CQIs of different target CQI types, and interference of the IAB-DU to reception of the IAB-MT is considered in interference information used for calculating the CQI of the target CQI type.

In this embodiment of the present application, for the CQI reported by the child IAB node, interference of the IAB-DU unit of the child IAB node to the IAB-MT unit of the child IAB node is considered in the reported CQI, so that the IAB node responsible for scheduling the child IAB node can adjust transmission parameters based on the interference of the IAB-DU unit of the child IAB node to the IAB-MT unit of the child IAB node.

In this embodiment of the present application, optionally, the target CQI type includes at least one of the following:
 a first CQI type, where interference corresponding to the interference information used for calculation of a CQI of the first CQI type includes interference of transmission of the IAB-DU to reception of the IAB-MT;
 a second CQI type, where interference corresponding to the interference information used for calculation of a CQI of the second CQI type includes interference of reception of the IAB-DU to reception of the IAB-MT;
 a third CQI type, where interference corresponding to the interference information used for calculation of a CQI of the third CQI type includes interference of another interference source to reception of the IAB-MT;
 a fourth CQI type, where interference corresponding to the interference information used for calculation of a CQI of the fourth CQI type includes a sum of interference of transmission of the IAB-DU to reception of the IAB-MT and interference of another interference source to reception of the IAB-MT; or
 a fifth CQI type, where interference corresponding to the interference information used for calculation of a CQI of the fifth CQI type includes a sum of interference of reception of the IAB-DU to reception of the IAB-MT and interference of another interference source to reception of the IAB-MT; where
 the another interference source is interference other than the interference of transmission and/or reception of the IAB-DU to reception of the IAB-MT.

(I) In some embodiments of the present application, the target CQI type may be determined in an explicit manner, which is illustrated by using an example below.

Optionally, the target CQI type is determined in at least one of the following manners:
 (1) Being specified by a protocol. or
 (2) Being configured by the IAB node or a CU.

If the target CQI type is configured by the IAB node or the CU, optionally, before the receiving a CQI reported by a child IAB node, the method further includes: sending CSI report configuration information to the child IAB node, where the CSI report configuration information carries the target CQI type.

In some embodiments of the present application, optionally, the CSI report configuration information includes a CSI report quantity field, the CSI report quantity field includes at least one report CQI item, and the report CQI item indicates at least one target CQI type that needs to be reported.

Optionally, the report CQI item is one of a plurality of optional parameter items specified by the protocol.

In some other embodiments of the present application, optionally, the CSI report configuration information includes a CSI report quantity field and an indicator field, the CSI report quantity field includes at least one report CQI item, and the indicator field is used to indicate at least one target CQI type corresponding to the report CQI item.

Optionally, the indicator field includes a target parameter, and the target parameter is used to indicate at least one target CQI type corresponding to the report CQI item, and the target parameter is one of a plurality of optional parameters specified by the protocol.

Optionally, the target CQI type carried in the CSI report configuration information is at least one of a plurality of optional CQI types specified by the protocol.

(3) Being dynamically indicated by the IAB node or the CU.

If the target CQI type is dynamically indicated by the IAB node or the CU, optionally, before the receiving a CQI reported by a child IAB node, the method further includes: sending downlink control information to the child IAB node, where the downlink control information is used to indicate at least one target CQI type that needs to be reported.

Optionally, the downlink control information includes a target code point, the target code point is used to indicate at least one target CQI type that needs to be reported, and the target CQI type indicated by the target code point is at least one of a plurality of CQI types specified by the protocol.

Optionally, the target code point is one of a plurality of optional code points specified by the protocol.

Optionally, the downlink control information is downlink control information that triggers aperiodic or semi-static CSI reporting.

(4) Being determined by the child IAB node.

Optionally, the determining a target CQI type of the reported CQI includes: obtaining the target CQI type carried in the reported CQI.

Optionally, before the determining a target CQI type of the reported CQI, the method further includes: sending CSI report configuration information to the child IAB node, where the CSI report configuration information carries an indicator indicating whether the target CQI type is carried in the CQI for reporting.

(II) In some embodiments of the present application, the target CQI type may be determined in an implicit manner, which is illustrated by using an example below.

In some embodiments of the present application, the determining a target CQI type of the reported CQI includes: determining, based on configuration of a measurement resource, the target CQI type of the reported CQI, where the measurement resource includes at least one of the following: a channel measurement resource, an interference measurement resource, or a cross-link interference measurement resource.

Optionally, the determining, based on configuration of a measurement resource, the target CQI type of the reported CQI includes at least one of the following:
 if the channel measurement resource and/or the interference measurement resource is configured with a first time occasion, reception of the IAB-MT and transmission of the IAB-DU being at the first time occasion, determining that the target CQI type includes at least one of the following: the first CQI type or the fourth CQI type;
 if the channel measurement resource and/or the interference measurement resource is configured with a second time occasion, reception of the IAB-MT and reception of the IAB-DU being at a second time occasion, determining that the target CQI type includes at least one of the following: the second CQI type or the fifth CQI type; or
 if the interference measurement resource configuration overlaps the cross-link interference measurement resource configuration, determining that the target CQI type includes at least one of the following: the second CQI type or the fifth CQI type.

The following describes the method for determining the target CQI type in the embodiments of the present application with reference to specific embodiments.

Embodiment 1

In this embodiment of the present application, the target CQI type is configured by the parent IAB node or the CU, for example, being configured in CSI-ReportConfig. The CSI-ReportConfig includes a CSI reportQuantity field, and the CSI reportQuantity field includes at least one report CQI item (for example, cri-RI-PMI-CQI_TypeA, cri-RI-PMI-CQI_TypeB, and cri-RI-PMI-CQI_TypeA&B, as described below), the report CQI item is used to indicate at least one target CQI type that needs to be reported.

In this embodiment of the present application, optionally, the report CQI item is one of a plurality of optional report CQI items specified by the protocol. Assuming that the optional report CQI items specified by the protocol include cri-RI-PMI-CQI_TypeA, cri-RI-PMI-CQI_TypeB, and cri-RI-PMI-CQI_TypeA&B, the report CQI item is selected from cri-RI-PMI-CQI_TypeA, cri-RI-PMI-CQI_TypeB, and cri-RI-PMI-CQI_TypeA&B, where cri-RI-PMI-CQI_TypeA is used to indicate the target CQI type that needs to be reported being TypeA, and cri-RI-PMI-CQI_TypeA&B is used to indicate the target CQI type that needs to be reported being TypeA and TypeB.

In this embodiment of the present application, optionally, the target CQI type carried in the CSI reportQuantity field is at least one of a plurality of optional CQI types specified by the protocol. It is assumed that the optional CQI types specified by the protocol include TypeA and TypeB, and the target CQI type carried in the CSI reportQuantity field is TypeA, TypeB, or TypeA&TypeB.

CSI-ReportConfig is configured as follows, where an underlined part is a newly added item.

| reportQuantity | CHOICE { |
|---|---|
| none | NULL, |
| cri-RI-LI-PMI-CQI | NULL, |
| cri-RI-LI-PMI-CQI TypeA | NULL, |
| cri-RI-LI-PMI-CQI TypeB | NULL, |
| cri-RI-LI-PMI-CQI TypeA&B | NULL, |
| ... | |
| cri-RI-i1 | NULL, |
| cri-RI-i1-CQI | SEQUENCE { |
| pdsch-BundleSizeForCSI | ENUMERATED {n2, n4} OPTIONAL -- Need S |
| }, | |
| cri-RI-i1-CQI_TypeA | SQUENCE { |
| pdsch-BundleSizeForCSI | ENUMERATED {n2, n4} OPTIONAL -- Need S |
| }, | |
| cri-RI-i1-CQI_TypeB | SEQUENCE { |
| pdsch-BundleSizeForCSI | ENUMERATED {n2, n4} OPTIONAL -- Need S |
| }, | |
| cri-RI-i1-CQI_TypeA&B | SEQUENCE { |
| pdsch-BundleSizeForCSI | ENUMERATED {n2, n4} OPTIONAL -- Need S |
| }, | |
| ... | |
| cri-RI-CQI | NULL, |
| cri-RI-CQI_TypeA | NULL, |
| cri-RI-CQI_TypeB | NULL, |
| cri-RI-CQI_TypeA&B | NULL, |
| ... | |
| cri-RSRP | NULL, |
| ssb-Index-RSRP | NULL, |
| cri-RI-LI-PMI-CQI | NULL |
| cri-RI-LI-PMI-CQI_TypeA | NULL |
| cri-RI-LI-PMI-CQI_TypeB | NULL |
| cri-RI-LI-PMI-CQI_TypeA&TypeB | NULL |
| ... | |
| } | |

Embodiment 2

In this embodiment of the present application, the target CQI type is configured by the parent IAB node or the CU, for example, being configured in CSI-ReportConfig. The CSI-ReportConfig includes a CSI reportQuantity field and an indicator field. The CSI reportQuantity field includes at least one report CQI item (for example, cri-RI-PMI-CQI and cri-RI-i1-CQI, as described below), and the indicator field includes a target parameter (for example, TypeA, TypeB, and TypeA&B, as described below), where the target parameter is used to indicate at least one target CQI type corresponding to the report CQI item. The indicator field is embedded in the CSI reportQuantity field or is a field parallel to the CSI reportQuantity field.

In this embodiment of the present application, optionally, the target parameter is one of a plurality of optional parameters specified by the protocol. For example, the optional parameters specified by the protocol include: TypeA, TypeB, and TypeA&B, and the indicator field carries one of TypeA, TypeB, or TypeA&B.

| reportQuantity | CHOICE { |
|---|---|
| none | NULL, |
| cri-RI-PMI-CQI | NULL, |
| cri-RI-i1 | NULL, |
| cri-RI-i1-CQI | SEQUENCE |
| pdsch-BundleSizeForCSI | ENUMERATED {n2, n4} OPTIONAL -- Need S |
| }, | |
| cri-RI-CQI | NULL, |
| cri-RSRP | NULL, |
| ssb-Index-RSRP | NULL, |
| cri-RI-LI-PMI-CQI | NULL |
| }, | |
| CQIType | CHOICE { |
| None | NULL, |
| TypeA | NULL, |
| TypeB | NULL, |
| TypeA&B | NULL, |
| ... | |
| } | |

Figure 7:
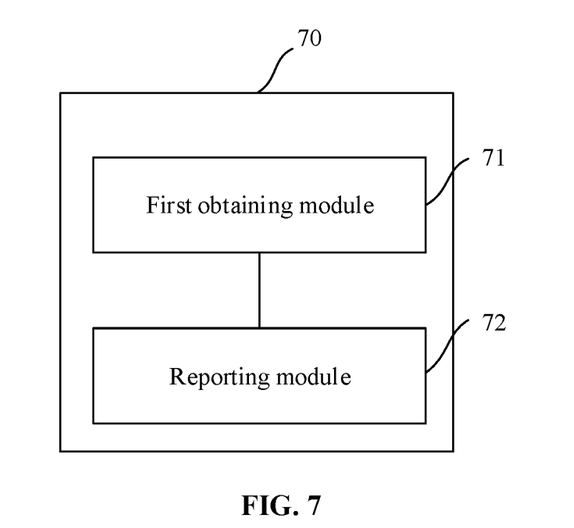
FIG. 7 is a schematic structural diagram of an IAB node according to an embodiment of the present application.

Referring to FIG. 7, the present application further provides an integrated access backhaul node 70. The IAB node 70 includes an IAB-DU and an IAB-MT, and further includes: a first obtaining module 71, configured to obtain a target CQI type that needs to be reported, where different interference information is used for calculating CQIs of different target CQI types, and interference of the IAB-DU to reception of the IAB-MT is considered in interference information used for calculating a CQI of the target CQI type; and a reporting module 72, configured to calculate and report the CQI of the target CQI type.

In this embodiment of the present application, the CQI reported by the IAB node can reflect the interference of the IAB-DU to the IAB-MT, thereby making the reported CQI more accurate.

Optionally, the target CQI type includes at least one of the following:
- a first CQI type, where interference corresponding to the interference information used for calculation of a CQI of the first CQI type includes interference of transmission of the IAB-DU to reception of the IAB-MT;
- a second CQI type, where interference corresponding to the interference information used for calculation of a CQI of the second CQI type includes interference of reception of the IAB-DU to reception of the IAB-MT;
- a third CQI type, where interference corresponding to the interference information used for calculation of a CQI of the third CQI type includes interference of another interference source to reception of the IAB-MT;
- a fourth CQI type, where interference corresponding to the interference information used for calculation of a CQI of the fourth CQI type includes a sum of interference of transmission of the IAB-DU to reception of the IAB-MT and interference of another interference source to reception of the IAB-MT; or
- a fifth CQI type, where interference corresponding to the interference information used for calculation of a CQI of the fifth CQI type includes a sum of interference of reception of the IAB-DU to reception of the IAB-MT and interference of another interference source to reception of the IAB-MT; where
- the another interference source is interference other than the interference of transmission and/or reception of the IAB-DU to reception of the IAB-MT.

Optionally, the target CQI type is determined in at least one of the following manners: being specified by a protocol; being configured by a parent IAB node or a CU; being dynamically indicated by the parent IAB node or the CU; or being determined by the IAB node.

Optionally, if the target CQI type is configured by the parent IAB node or the CU, the first obtaining module is configured to receive CSI report configuration information, where the CSI report configuration information carries the target CQI type.

Optionally, the CSI report configuration information includes a CSI report quantity field, the CSI report quantity field includes at least one report CQI item, and the report CQI item indicates at least one target CQI type that needs to be reported; or the CSI report configuration information includes a CSI report quantity field and an indicator field, the CSI report quantity field includes at least one report CQI item, and the indicator field is used to indicate at least one target CQI type corresponding to the report CQI item.

Optionally, the target CQI type carried in the CSI report configuration information is at least one of a plurality of optional CQI types specified by the protocol.

Optionally, if the target CQI type is dynamically indicated by the parent IAB node or the CU, the first obtaining module is configured to receive downlink control information, where the downlink control information is used to indicate at least one target CQI type that needs to be reported.

Optionally, the downlink control information is downlink control information that triggers aperiodic or semi-static CSI reporting.

Optionally, the reporting module is configured to carry the target CQI type during CQI reporting.

Optionally, the IAB node further includes:
- a second obtaining module, configured to obtain CSI report configuration information, where the CSI report configuration information carries an indicator indicating whether the target CQI type is carried in the CQI for reporting.

Optionally, the first obtaining module is configured to obtain, based on configuration of a measurement resource, the target CQI type that needs to be reported, where the measurement resource includes at least one of the following: a channel measurement resource, an interference measurement resource, or a cross-link interference measurement resource.

Optionally, the first obtaining module executes at least one of the following:
- if the channel measurement resource and/or the interference measurement resource is configured with a first time occasion, reception of the IAB-MT and transmission of the IAB-DU being at the first time occasion, determining that the target CQI type includes at least one of the following: the first CQI type or the fourth CQI type;
- if the channel measurement resource and/or the interference measurement resource is configured with a second time occasion, reception of the IAB-MT and reception of the IAB-DU being at a second time occasion, determining that the target CQI type includes at least one of the following: the second CQI type or the fifth CQI type; or
- if the interference measurement resource configuration overlaps the cross-link interference measurement resource configuration, determining that the target CQI type includes at least one of the following: the second CQI type or the fifth CQI type.

The IAB node provided in this embodiment of the present application is capable of implementing the processes implemented by the IAB node in the method embodiment in FIG. 5. To avoid repetition, details are not described herein again.

Figure 8:
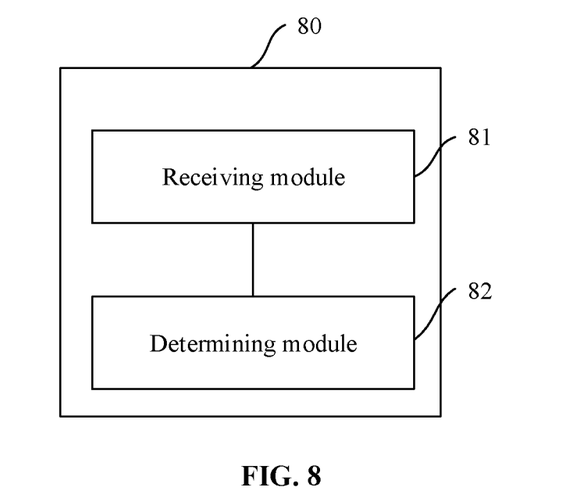
FIG. 8 is a schematic structural diagram of an IAB node according to another embodiment of the present application.

Referring to FIG. 8, the present application further provides an integrated access backhaul node 80, including:
- a receiving module 81, configured to receive a CQI reported by a child IAB node, where the child IAB node includes an IAB-DU and an IAB-MT; and
- a determining module 82, configured to determine a target CQI type of the reported CQI, where different interference information is used for calculating CQIs of different target CQI types, and interference of the IAB-DU to reception of the IAB-MT is considered in interference information used for calculating the CQI of the target CQI type.

In this embodiment of the present application, for the CQI reported by the child IAB node, interference of the IAB-DU unit of the child IAB node to the IAB-MT unit of the child IAB node is considered in the reported CQI, so that the IAB node responsible for scheduling the child IAB node can adjust transmission parameters based on the interference of the IAB-DU unit of the child IAB node to the IAB-MT unit of the child IAB node.

Optionally, the target CQI type includes at least one of the following:
- a first CQI type, where interference corresponding to the interference information used for calculation of a CQI of the first CQI type includes interference of transmission of the IAB-DU to reception of the IAB-MT;
- a second CQI type, where interference corresponding to the interference information used for calculation of a CQI of the second CQI type includes interference of reception of the IAB-DU to reception of the IAB-MT;
- a third CQI type, where interference corresponding to the interference information used for calculation of a CQI of the third CQI type includes interference of another interference source to reception of the IAB-MT;

a fourth CQI type, where interference corresponding to the interference information used for calculation of a CQI of the fourth CQI type includes a sum of interference of transmission of the IAB-DU to reception of the IAB-MT and interference of another interference source to reception of the IAB-MT; or a fifth CQI type, where interference corresponding to the interference information used for calculation of a CQI of the fifth CQI type includes a sum of interference of reception of the IAB-DU to reception of the IAB-MT and interference of another interference source to reception of the IAB-MT; where the another interference source is interference other than the interference of transmission and/or reception of the IAB-DU to reception of the IAB-MT.

Optionally, the target CQI type is determined in at least one of the following manners: being specified by a protocol;
being configured by the IAB node or a CU;
being dynamically indicated by the IAB node or the CU; or
being determined by the child IAB node.

Optionally, if the target CQI type is configured by the IAB node or the CU, the IAB node further includes:
a first sending module, configured to send CSI report configuration information to the child IAB node, where the CSI report configuration information carries the target CQI type.

Optionally, the CSI report configuration information includes a CSI report quantity field, the CSI report quantity field includes at least one report CQI item, and the report CQI item is used to indicate at least one target CQI type that needs to be reported; or the CSI report configuration information includes a CSI report quantity field and an indicator field, the CSI report quantity field includes at least one report CQI item, and the indicator field is used to indicate at least one target CQI type corresponding to the report CQI item.

Optionally, the target CQI type carried in the CSI report configuration information is at least one of a plurality of optional CQI types specified by the protocol.

Optionally, if the target CQI type is dynamically indicated by the IAB node or the CU, the IAB node further includes:
a second sending module, configured to send downlink control information to the child IAB node, where the downlink control information is used to indicate at least one target CQI type that needs to be reported.

Optionally, the downlink control information is downlink control information that triggers aperiodic or semi-static CSI reporting.

Optionally, the determining module is configured to obtain the target CQI type carried in the reported CQI.

Optionally, the IAB node further includes:
a third sending module, configured to send CSI report configuration information to the child IAB node, where the CSI report configuration information carries an indicator indicating whether the target CQI type is carried in the CQI for reporting.

Optionally, the determining module is configured to determine, based on configuration of a measurement resource, the target CQI type of the reported CQI, where the measurement resource includes at least one of the following: a channel measurement resource, an interference measurement resource, or a cross-link interference measurement resource.

Optionally, the determining module is configured to execute at least one of the following:
if the channel measurement resource and/or the interference measurement resource is configured with a first time occasion, reception of the IAB-MT and transmission of the IAB-DU being at the first time occasion, determining that the target CQI type includes at least one of the following: the first CQI type or the fourth CQI type;
if the channel measurement resource and/or the interference measurement resource is configured with a second time occasion, reception of the IAB-MT and reception of the IAB-DU being at a second time occasion, determining that the target CQI type includes at least one of the following: the second CQI type or the fifth CQI type; or if the interference measurement resource configuration overlaps the cross-link interference measurement resource configuration, determining that the target CQI type includes at least one of the following: the second CQI type or the fifth CQI type.

The IAB node provided in this embodiment of the present application is capable of implementing the processes implemented by the IAB node in the method embodiment in FIG. 6. To avoid repetition, details are not described herein again.

Figure 9:
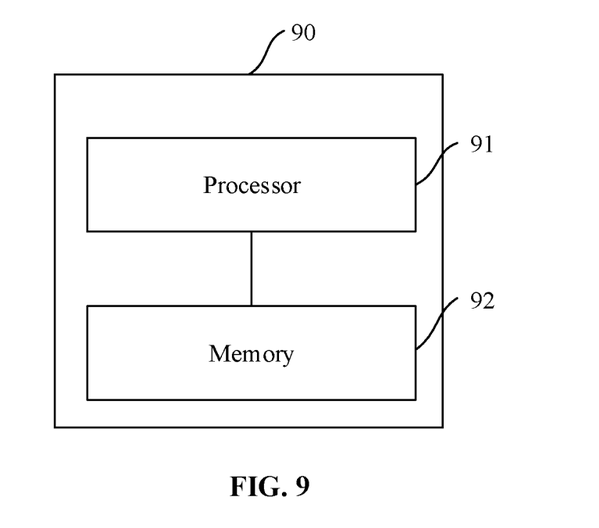
FIG. 9 is a schematic structural diagram of an IAB node according to still another embodiment of the present application.

Optionally, an embodiment of the present application further provides an integrated access backhaul node 90, including a processor 91, a memory 92, and a computer program stored in the memory 92 and capable of running on the processor 91. When the computer program is executed by the processor 91, the processes of the foregoing embodiment of the channel quality indicator reporting method shown in FIG. 5 are implemented, with the same technical effects achieved. To avoid repetition, details are not described herein again.

Figure 10:
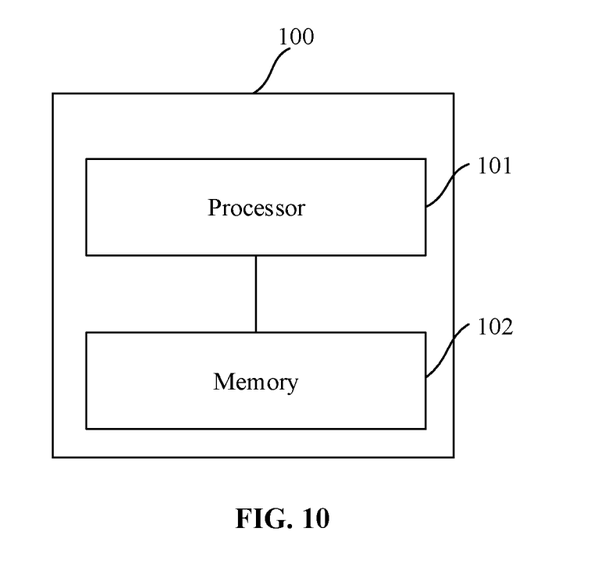
FIG. 10 is a schematic structural diagram of an IAB node according to yet another embodiment of the present application.

Optionally, an embodiment of the present application further provides an integrated access backhaul node 100, including a processor 101, a memory 102, and a computer program stored in the memory 102 and capable of running on the processor 101. When the computer program is executed by the processor 101, the processes of the foregoing embodiment of the channel quality indicator reporting method shown in FIG. 6 are implemented, with the same technical effects achieved. To avoid repetition, details are not described herein again.

An embodiment of the present application further provides a computer-readable storage medium, where a computer program is stored in the computer-readable storage medium. When the computer program is executed by a processor, the processes of the foregoing embodiment of the channel quality indicator reporting method shown in FIG. 5 are implemented, with the same technical effects achieved. To avoid repetition, details are not described herein again.

An embodiment of the present application further provides a computer-readable storage medium, where a computer program is stored in the computer-readable storage medium. When the computer program is executed by a processor, the processes of the foregoing embodiment of the channel quality indicator reporting method shown in FIG. 6 are implemented, with the same technical effects achieved. To avoid repetition, details are not described herein again.

The computer-readable storage medium is, for example, a read-only memory (Read-Only Memory, ROM), a random access memory (Random Access Memory, RAM), a magnetic disk, or an optical disc.

The processor may be one processor, or may be a collective term for a plurality of processing components. For example, the processor may be a CPU, or may be an ASIC, or is configured as one or more integrated circuits for implementing the method performed by the IAB node, for example, one or more microprocessors DSPs, or one or more field programmable gate arrays FPGAs. A storage component may be a memory, or may be a collective term for a plurality of storage components.

The memory may be a volatile memory or a non-volatile memory, or may include a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (Random Access Memory, RAM), which is used as an external cache. As illustrative rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory described in this application is intended to include but is not limited to these and any other suitable types of memories.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of the present application essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present application.

The embodiments of the present application are described above with reference to the accompanying drawings, but the present application is not limited to the foregoing implementations. The foregoing embodiments are only illustrative rather than restrictive. Inspired by the present application, a person of ordinary skill in the art can still derive many variations without departing from the essence of the present application and the protection scope of the claims. All these variations shall fall within the protection of the present application.

What is claimed is:

1. A channel quality indicator reporting method, performed by an integrated access backhaul (IAB) node, wherein the IAB node comprises an IAB node distributed unit (IAB-DU) and an IAB node mobile terminal (IAB-MT), and the method comprises:
    obtaining a target channel quality indicator (CQI) type that needs to be reported, wherein different interference information is used for calculating CQIs of different target CQI types, and interference of the IAB-DU to reception of the IAB-MT is considered in interference information used for calculating a CQI of the target CQI type; and
    calculating and reporting the CQI of the target CQI type;
    wherein the target CQI type comprises at least one of the following:
    a first CQI type, wherein interference corresponding to the interference information used for calculation of a CQI of the first CQI type comprises interference of transmission of the IAB-DU to reception of the IAB-MT;
    a second CQI type, wherein interference corresponding to the interference information used for calculation of a CQI of the second CQI type comprises interference of reception of the IAB-DU to reception of the IAB-MT;
    a third CQI type, wherein interference corresponding to the interference information used for calculation of a CQI of the third CQI type comprises interference of another interference source to reception of the IAB-MT;
    a fourth COI type, wherein interference corresponding to the interference information used for calculation of a CQI of the fourth CQI type comprises a sum of interference of transmission of the IAB-DU to reception of the IAB-MT and interference of another interference source to reception of the IAB-MT; or
    a fifth CQI type, wherein interference corresponding to the interference information used for calculation of a COI of the fifth CQI type comprises a sum of interference of reception of the IAB-DU to reception of the LAB-MT and interference of another interference source to reception of the IAB-MT; wherein
    the another interference source is interference other than the interference of transmission and/or reception of the IAB-DU to reception of the IAB-MT.

2. The method according to claim 1, wherein the target CQI type is obtained in at least one of the following manners:
    being specified by a protocol;
    being configured by a parent IAB node or a centralized unit (CU);
    being dynamically indicated by the parent IAB node or the CU; or
    being determined by the IAB node.

3. The method according to claim 2, wherein if the target CQI type is configured by the parent IAB node or the CU, the obtaining a target CQI type that needs to be reported comprises:
    receiving channel state information (CSI) report configuration information, wherein the CSI report configuration information carries the target CQI type;
    or
    wherein if the target CQI type is dynamically indicated by the parent IAB node or the CU, the obtaining a target CQI type that needs to be reported comprises:
    receiving downlink control information, wherein the downlink control information is used to indicate at least one target CQI type that needs to be reported.

4. The method according to claim 3, wherein
the CSI report configuration information comprises a CSI report quantity field, the CSI report quantity field comprises at least one report CQI item, and the report CQI item indicates at least one target CQI type that needs to be reported; or
the CSI report configuration information comprises a CSI report quantity field and an indicator field, the CSI report quantity field comprises at least one report CQI item, and the indicator field is used to indicate at least one target CQI type corresponding to the report CQI item; or
wherein the downlink control information is downlink control information that triggers aperiodic or semi-static CSI reporting.

5. The method according to claim 2, wherein the calculating and reporting the CQI of the target CQI type comprises:
having the target CQI type carried in the CQI for reporting.

6. The method according to claim 5, before the calculating and reporting the CQI of the target CQI type, further comprising:
obtaining CSI report configuration information, wherein the CSI report configuration information carries an indicator indicating whether the target CQI type is carried in the CQI for reporting.

7. The method according to claim 1, wherein the obtaining a target CQI type that needs to be reported comprises:
obtaining, based on configuration of a measurement resource, the target CQI type that needs to be reported, wherein the measurement resource comprises at least one of the following: a channel measurement resource, an interference measurement resource, or a cross-link interference measurement resource.

8. The method according to claim 7, wherein the obtaining, based on configuration of a measurement resource, the target CQI type that needs to be reported comprises at least one of the following:
if the channel measurement resource and/or the interference measurement resource is configured with a first time occasion, reception of the IAB-MT and transmission of the IAB-DU being at the first time occasion, determining that the target CQI type comprises at least one of the following: the first CQI type or the fourth CQI type;
if the channel measurement resource and/or the interference measurement resource is configured with a second time occasion, reception of the IAB-MT and reception of the IAB-DU being at a second time occasion, determining that the target CQI type comprises at least one of the following: the second CQI type or the fifth CQI type; or
if the interference measurement resource configuration overlaps the cross-link interference measurement resource configuration, determining that the target CQI type comprises at least one of the following: the second CQI type or the fifth CQI type.

9. A channel quality indicator reporting method, performed by an integrated access backhaul (IAB) node and comprising:
receiving a channel quality indicator (CQI) reported by a child IAB node, wherein the child IAB node comprises an IAB node distributed unit (IAB-DU) and an IAB node mobile terminal (IAB-MT); and
determining a target CQI type of the reported CQI, wherein different interference information is used for calculating CQIs of different target CQI types, and interference of the IAB-DU to reception of the IAB-MT is considered in interference information used for calculating the CQI of the target CQI type;
wherein the target CQI type comprises at least one of the following:
a first CQI type, wherein interference corresponding to the interference information used for calculation of a CQI of the first CQI type comprises interference of transmission of the IAB-DU to reception of the IAB-MT;
a second CQI type, wherein interference corresponding to the interference information used for calculation of a CQI of the second CQI type comprises interference of reception of the IAB-DU to reception of the IAB-MT;
a third CQI type, wherein interference corresponding to the interference information used for calculation of a CQI of the third CQI type comprises interference of another interference source to reception of the IAB-MT;
a fourth CQI type, wherein interference corresponding to the interference information used for calculation of a CQI of the fourth CQI type comprises a sum of interference of transmission of the IAB-DU to reception of the IAB-MT and interference of another interference source to reception of the IAB-MT; or
a fifth CQI type, wherein interference corresponding to the interference information used for calculation of a CQI of the fifth CQI type comprises a sum of interference of reception of the IAB-DU to reception of the IAB-MT and interference of another interference source to reception of the IAB-MT; wherein
the another interference source is interference other than the interference of transmission and/or reception of the IAB-DU to reception of the IAB-MT.

10. The method according to claim 9, wherein the target CQI type is determined in at least one of the following manners:
being specified by a protocol;
being configured by the IAB node or a centralized unit (CU);
being dynamically indicated by the IAB node or the CU; or
being determined by the child IAB node.

11. The method according to claim 10, wherein if the target CQI type is configured by the IAB node or the CU, before the receiving a CQI reported by a child IAB node, the method further comprises:
sending channel state information (CSI) report configuration information to the child IAB node, wherein the CSI report configuration information carries the target CQI type;
or
wherein if the target CQI type is dynamically indicated by the IAB node or the CU, before the receiving a CQI reported by a child IAB node, the method further comprises:
sending downlink control information to the child IAB node, wherein the downlink control information is used to indicate at least one target CQI type that needs to be reported.

12. The method according to claim 11, wherein
the CSI report configuration information comprises a CSI report quantity field, the CSI report quantity field comprises at least one report CQI item, and the report CQI item indicates at least one target CQI type that needs to be reported; or the CSI report configuration information comprises a CSI report quantity field and an indicator field, the CSI report quantity field comprises at least one report CQI item, and the indicator field is used to indicate at least one target CQI type corresponding to the report CQI item; or wherein the downlink control information is downlink control information that triggers aperiodic or semi-static CSI reporting.

13. The method according to claim 10, wherein the determining a target CQI type of the reported CQI comprises:
obtaining the target CQI type carried in the reported CQI.

14. The method according to claim 13, before the determining a target CQI type of the reported CQI, further comprising:
sending CSI report configuration information to the child IAB node, wherein the CSI report configuration information carries an indicator indicating whether the target CQI type is carried in the CQI for reporting.

15. The method according to claim 9, wherein the determining a target CQI type of the reported CQI comprises:
determining, based on configuration of a measurement resource, the target CQI type of the reported CQI, wherein the measurement resource comprises at least one of the following: a channel measurement resource, an interference measurement resource, or a cross-link interference measurement resource.

16. The method according to claim 15, wherein the determining, based on configuration of a measurement resource, the target CQI type of the reported CQI comprises at least one of the following:

if the channel measurement resource and/or the interference measurement resource is configured with a first time occasion, reception of the IAB-MT and transmission of the IAB-DU being at the first time occasion, determining that the target CQI type comprises at least one of the following: the first CQI type or the fourth CQI type;

if the channel measurement resource and/or the interference measurement resource is configured with a second time occasion, reception of the IAB-MT and reception of the IAB-DU being at a second time occasion, determining that the target CQI type comprises at least one of the following: the second CQI type or the fifth CQI type; or if the interference measurement resource configuration overlaps the cross-link interference measurement resource configuration, determining that the target CQI type comprises at least one of the following: the second CQI type or the fifth CQI type.

17. An integrated access backhaul node, comprising a processor, a memory, and a computer program stored in the memory and capable of running on the processor, wherein when the computer program is executed by the processor, the steps of the channel quality indicator reporting method according to claim 1 are implemented.

18. An integrated access backhaul node, comprising a processor, a memory, and a computer program stored in the memory and capable of running on the processor, wherein when the computer program is executed by the processor, the steps of the channel quality indicator reporting method according to claim 9 are implemented.

* * * * *